United States Patent [19]
Phillips

[11] Patent Number: 5,718,149
[45] Date of Patent: Feb. 17, 1998

[54] YOKE APPARATUS FOR RACK AND PINION

[75] Inventor: Edward H. Phillips, Troy, Mich.

[73] Assignee: Techco Corporation, Southfield, Mich.

[21] Appl. No.: 407,644

[22] Filed: Mar. 21, 1995

[51] Int. Cl.[6] .................................................... B62D 3/12
[52] U.S. Cl. ................................................ 74/422; 74/498
[58] Field of Search ..................... 74/422, 498; 384/37, 384/42; 180/427, 428

[56] References Cited

U.S. PATENT DOCUMENTS

| | | | |
|---|---|---|---|
| 3,680,443 | 8/1972 | Jenvey | 74/422 X |
| 4,475,413 | 10/1984 | Higuchi | 74/422 |
| 4,683,769 | 8/1987 | Mochizuki et al. | 74/422 |
| 4,709,593 | 12/1987 | Takechi | 74/498 |
| 4,793,433 | 12/1988 | Emori et al. | 180/148 X |
| 4,936,157 | 6/1990 | Kotake et al. | 74/422 |
| 4,939,947 | 7/1990 | Toyoshima et al. | 74/422 |
| 5,058,448 | 10/1991 | Kiyooka et al. | 74/422 |
| 5,203,216 | 4/1993 | Hasegawa | 74/498 |
| 5,265,691 | 11/1993 | Konishi et al. | 180/148 |
| 5,272,933 | 12/1993 | Collier et al. | 74/498 |
| 5,316,043 | 5/1994 | Phillips . | |

FOREIGN PATENT DOCUMENTS

| | | | |
|---|---|---|---|
| 61-193966 | 8/1986 | Japan | 180/147 |
| 6-92243 | 4/1994 | Japan | 180/148 |

OTHER PUBLICATIONS

Chilton—Taurus/Sable/Continental, Suspension and Steering, 1986–89, Book 7830, p. 329.

*Primary Examiner*—Richard M. Lorence
*Assistant Examiner*—Troy Grabow
*Attorney, Agent, or Firm*—Gifford, Krass, Groh, Sprinkle, Patmore, Anderson & Citkowski, P.C.

[57] ABSTRACT

A bifurcated rack bearing assembly for a steering system includes a bearing member having a pair of bearing surfaces and which is pivotable within a base. The bearing member has a pair of curved riding surfaces which slide on a curved saddle surface of the base to permit the bearing surfaces to pivot into alignment coaxial with an axis of translation of the rack. The bifurcated rack bearing assembly can be substituted for the rack bearings of conventional steering systems.

6 Claims, 3 Drawing Sheets

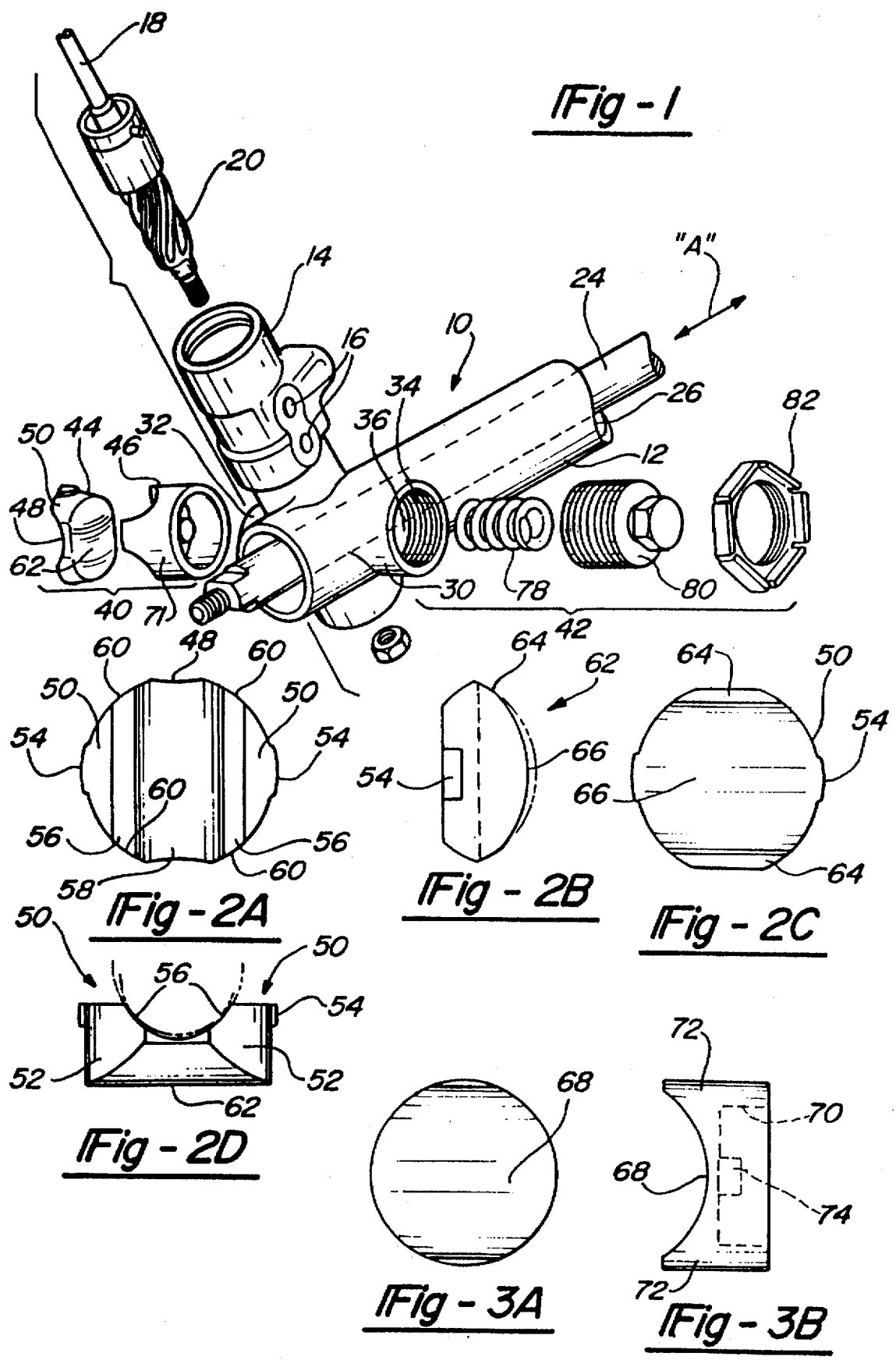

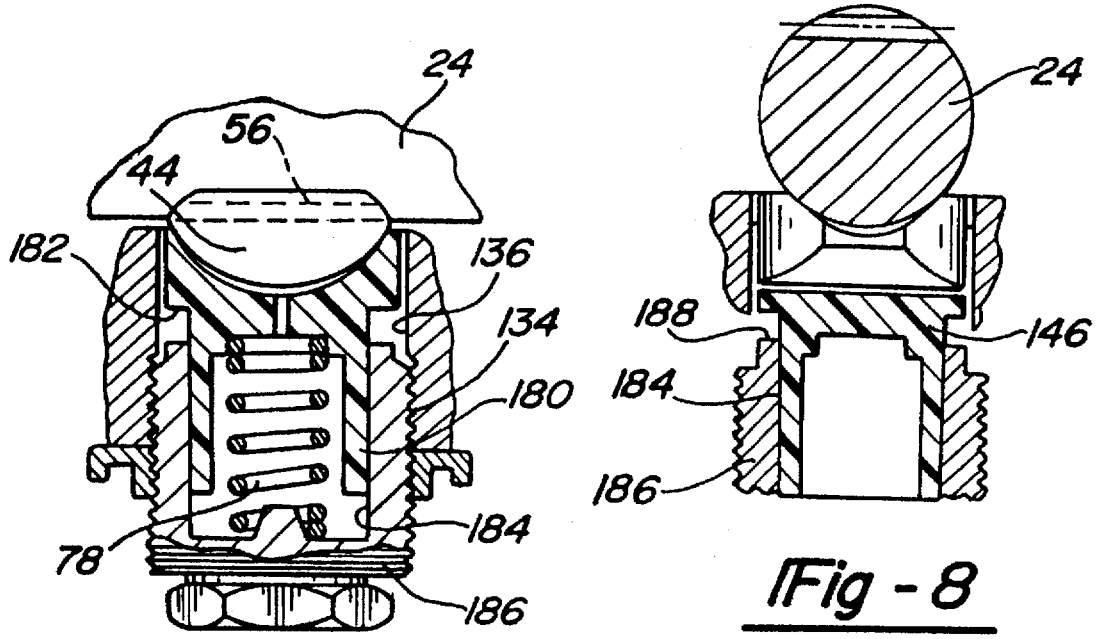

5,718,149

YOKE APPARATUS FOR RACK AND PINION

BACKGROUND OF THE INVENTION

I. Field of the Invention

The field of the invention is directed to a rack bearing assembly for a yoke apparatus for use with a rack-and-pinion steering system.

II. Description of the Prior Art

Automotive steering systems typically include a housing having a rack driven by a pinion gear. Rotation of a steering wheel turns the pinion gear. The pinion gear meshes with a plurality of teeth formed on the rack to drive the rack in one of two reciprocal directions. The rack in turn is connected to a pair of dirigible wheels. In addition, many automotive steering systems comprise a rotary control valve which is operable to supply pressurized fluid to move a double-acting hydraulic cylinder or actuator to assist translation of the rack.

In order to keep the teeth of the pinion gear teeth and the teeth of the rack in engagement, conventional steering systems employ a yoke apparatus. The yoke apparatus includes a rack bearing which is biased to force the rack towards the pinion gear. The rack bearing has a pair of spaced apart bearing surfaces which slidingly contact the surface of the rack opposite the teeth of the rack. The rack bearing is mounted in a bore in the housing which is formed in a nominally orthogonal manner with reference to the housing in an effort to align the bearing surfaces along an axis which extends coaxially with the nominal axis of translation of the rack. A spring is mounted in the bore to force the yoke assembly against the rack and bias the bearing surfaces in order to force the teeth of the rack against the teeth of the pinion gear. Thus, the yoke apparatus operates to nominally guide the rack along the axis of translation and hold the teeth of the rack and pinion in mesh during the application of torque to the pinion gear.

In practice, it is not possible to maintain the axis of translation of the rack orthogonal to the axis of the bore. This is because of the tolerances involved in forming the bore, rack and pinion gear. Accordingly, it has been found that the axis of translation of the rack may be angled with respect to the axis of the bearing surfaces of the rack bearing, and may even undulate as a function of rotational motion of the pinion. When so misaligned, one end of each of the support surfaces engage the rack while opposite ends of the support surfaces are spaced away from the rack. As a further result, the rack bearing itself may suffer angular misalignment within the bore and jam. In fact, such yoke assemblies may be said to be over constrained or to be of non-Kinematic design.

For the above reasons, the rack is often held from smooth movement in one, or both, directions of travel. This is particularly so when the rack travels in a direction from the contacting ends towards the non-contacting ends of the support surface. The edges resist movement of the rack and the rack tends to hesitate and jerk in its movement. However, movement of the rack in an opposite direction tends to produce a smoother, less resistant movement. Frequently, the discontinuous or halting movement of the rack will be tactilly sensed by the driver.

The spring is located in an adjuster plug which is threadably inserted in the outer portion of the bore. During assembly of the yoke apparatus, the adjuster plug is rotatably driven into contact with the rack bearing with a nominal torque value of perhaps 50 in.lbs. to provide a rotational position calibration. Because of the above noted tolerances involved in forming the bore, rack and pinion gear, there results a soft contact between the adjuster plug and the rack bearing, and thus an imprecise rotational position calibration. For this reason, the adjuster plug must then be backed off by an angle of about 30 degrees in order to ensure interference free operation in the manner described above. This results in an indefinite stop position of the rack bearing should a torque level be applied that is sufficient to overcome the spring bias.

Because of the possibility of excessive operating clearance in the mesh between pinion gear and rack teeth, a spring strong enough to guarantee full engagement of pinion gear and rack teeth for all levels of applied steering wheel torque is utilized. This results in excessive Coulomb friction both with reference to the mesh of the pinion gear and rack teeth and contact of the bearing surfaces and the rack. The Coulomb friction results in hysteresis in the relationship between applied torque and rack motion. The result is a reluctance of such rack-and-pinion steering systems to return to center. This is true for both manual and power assisted steering systems and is one of the causes of imprecise "on-center feel".

SUMMARY OF THE INVENTION

Accordingly, a primary object of the present invention is to provide a yoke apparatus having a true Kinematic design wherein bearing surfaces are maintained in coaxial alignment with the axis of movement of the rack to provide smooth, constant movement of the rack in both directions of travel. Another objective of the present invention is to provide a yoke apparatus having precise rotational position calibration thus enabling a significantly reduced back off angle and the use of a considerably lighter spring for significantly reduced levels of Coulomb friction and resulting hysteresis.

Accordingly, in a preferred embodiment of the present invention, an improved yoke apparatus is presented that includes a bifurcated rack bearing assembly mounted in the housing of a conventional rack and pinion steering system. The bifurcated rack bearing assembly has a bearing disk pivotally supported in a base. The bearing disk has a groove having a pair of spaced apart bearing surfaces extending on one side and a pair of curvilinear riding surfaces formed orthogonally on an opposite side. The base is cylindrical with a portion having a saddle shaped surface formed in one end for receiving the riding surfaces of the bearing disk. The saddle surface is formed to receive the riding surfaces and to permit the bearing disk to pivot thereon along an axis orthogonal to the axis of movement of the rack. In this way, the above described over constraint is eliminated and the bearing surfaces can align coaxially with the axis of movement of the rack.

In a first alternative preferred embodiment of the present invention, an adjuster plug is provided with a bore for receiving a matching cylindrical surface of the base. The adjuster plug and the base have orthogonal shoulders which come into precise contact during the rotational position calibration described above. The resulting precise rotational position calibration allows for utilization of a minimal back off and thus, a considerably lighter spring for biasing the bearing disk and base against the rack.

The bifurcated rack bearing assembly and lighter spring may be exchanged for a conventional rack bearing and spring with no other modification to the system. The bifurcated rack bearing assembly is configured for installation in the housing of conventional steering systems and provides improved on-center feel and improved steering performance generally. The Kinematic design of the bifurcated rack bearing assembly permits the axis of the bearing surfaces of the rack bearing to be in precise alignment with the rack which enables smooth movement of the rack. The lighter spring exerts much less biasing force than the spring of prior art devices and there is less hysteresis in the steering system.

BRIEF DESCRIPTION OF THE DRAWINGS

The foregoing and other objects and advantages of the present invention will become readily apparent to those skilled in the art upon studying the following detailed description, when considered in connection with the accompanying drawings, in which:

FIG. 1 is an exploded perspective view of a steering system including a yoke apparatus in accordance with the invention;

FIG. 2A is an end view of a bearing member of the yoke apparatus in accordance with a preferred embodiment of the invention;

FIG. 2B is a side view of the bearing member of the yoke apparatus in accordance with a preferred embodiment of the invention;

FIG. 2C is a bottom view of the bearing member of the yoke apparatus in accordance with a preferred embodiment of the invention;

FIG. 2D is a side view of the bearing member of the yoke apparatus rotated 90° from the end view of FIG. 2A in accordance with a preferred embodiment of the invention;

FIG. 3A is a top view of a base of the yoke apparatus in accordance with a preferred embodiment of the invention;

FIG. 3B is an end view of the base of the yoke apparatus taken in accordance with a preferred embodiment of the invention;

FIG. 7 is a sectional side view of the preferred alternative embodiment of the yoke apparatus in accordance with the invention; and FIG. 8 is a sectional side view rotated 90° from the sectional view of FIG. 7 of the preferred alternative embodiment in accordance with the invention.

DETAILED DESCRIPTION OF THE PREFERRED EMBODIMENTS

Figure 3C:
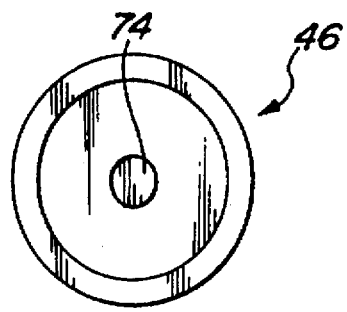
FIG. 3C is a bottom view of the base of the yoke apparatus in accordance with a preferred embodiment of the invention.
Figure 3D:
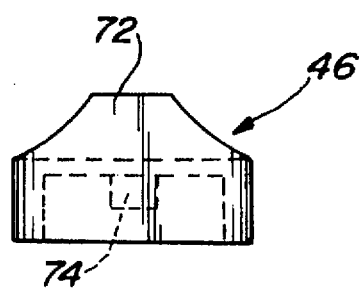
FIG. 3D is a side view of the base of the yoke apparatus rotated 90° from the end view of FIG. 3B in accordance with a preferred embodiment of the invention.

Referring first to the exploded perspective illustration of FIG. 1, thereshown is a portion of a steering apparatus for a vehicle (not shown). The steering apparatus includes a conventional housing 10, such as manufactured by the Ford Motor Co. of Dearborn, Mich. The housing includes a barrel 12 extending upwardly from a cylinder 14. The barrel 12 houses a rotary control valve for providing pressurized hydraulic fluid through ports 16 to a hydraulic actuator (not shown) for providing hydraulic assist to the steering system. One end of a torsion bar 18 is connected to a pinion gear 20. The pinion gear is mounted to mesh with a plurality of teeth 22 (FIGS. 4 and 5) of a rack 24. The rack 24 is mounted for reciprocal movement along an axis of translation "A" in an elongated cavity 26 of the housing 10. Another end of the torsion bar is connected to an input shaft of the rotary control valve and thereby to a steering wheel (neither shown).

Figure 4:
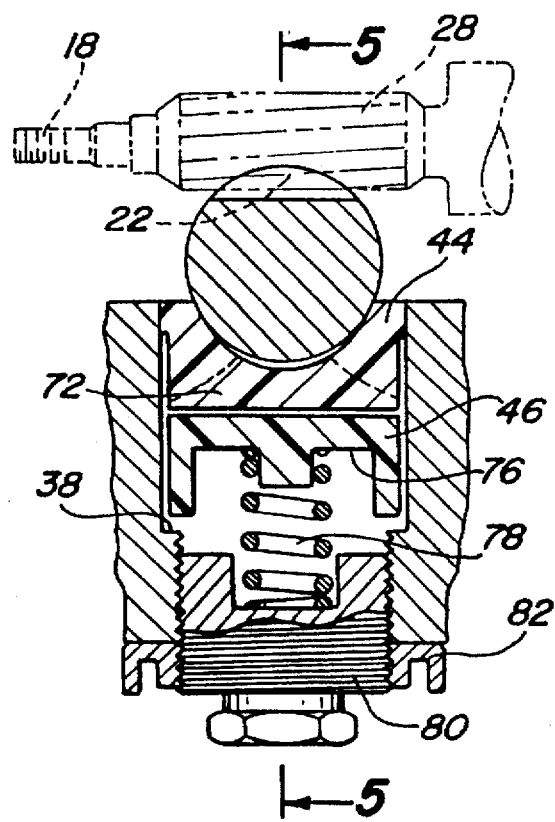
FIG. 4 is a sectional view of the yoke apparatus, rack and pinion gear of a preferred embodiment of the invention.
Figure 5:
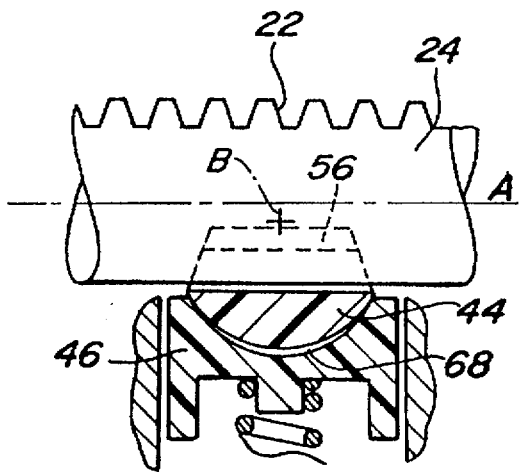
FIG. 5 is a sectional side view of a bearing member and a base of a preferred embodiment of the yoke apparatus in accordance with the invention.

As is best shown in FIGS. 4 and 5, the teeth 22 extend in a nominally axial direction on the surface of the rack. The teeth 22 of the rack 24 are formed to mesh with a plurality of teeth 28 formed on the pinion gear 20 so that movement of the pinion gear 20 by the steering wheel, input shaft and torsion bar 18 will cause reciprocal translation of the rack 24 along the axis of translation "A". As is known in the art, the rack 24 is connected to dirigible wheels to steer the vehicle.

As shown in FIG. 1, a cylindrical sleeve 30 is formed on one side of the cylinder 14 of the housing and a port 32 is formed on an opposite side of the cylinder 14. The sleeve includes a threaded aperture 34 and a bore 36 for accepting an improved yoke assembly. The bore 36 has a larger diameter than the aperture 34 and includes an annular shoulder 38 as shown in FIG. 4. The sleeve 30 and bore 36 extend in a substantially orthogonal direction with reference to the axis of translation "A" of the rack.

As shown in FIG. 1, the improved yoke assembly includes a bifurcated rack bearing assembly 40 and a spring assembly 42. The rack bearing assembly 40 is biased against the rack 24 by the spring assembly 42. The rack bearing assembly 40 includes a bearing disk 44 pivotally mounted on a base 46.

As shown in FIGS. 2A, 2B, 2C, and 2D, one side of the bearing disk 44 has a curvilinear groove 48 defining a pair of arms 50. Each arm 50 has a circumferential outer surface 52 having a diameter slightly less than the diameter of the bore 36 of the sleeve 30. A pair of pads 54 extend radially outwardly from the outer surface to slidingly locate the bearing disk 44 in a transverse manner with reference to the axis of translation "A" and the bore 36.

As shown in FIG. 1 and 2A, the groove 48 includes a cutaway center portion 58 extending between a pair of elongated bearing surfaces 56. Each bearing surface 56 is curved and extends axially to a pair of edges 60. In combination, they define a radius of curvature equal or slightly greater than the radius of the rack 24. The bearing surfaces are spaced apart to guide the rack during movement thereof. The center portion 58 has a smaller radius of curvature than that of the bearing surfaces 56, thereby providing a deeper groove with clearance space between the bearing disk 44 and the rack 24, as shown in FIG. 4.

As shown in FIGS. 2B and 2C, the bearing disk 44 has a curvilinear bottom surface 62 to facilitate pivotal movement of the bearing disk on the base 46. The bottom surface includes a pair of riding surfaces 64 spaced on either side of a curved intermediate surface 66. The riding surfaces 64 extend orthogonally to the bearing surfaces 56 and are formed to pivotally ride on the base.

As shown in FIG. 5, the pivotal movement of the bearing disk 44 is about an axis "B" located between the bearing surfaces 56 and the axis of translation "A". This causes the bearing disk to rotate away from the direction of motion of the rack along the axis of translation "A" thus forming a hydrodynamic bearing between the bearing surfaces 56 and the rack 24. This allows the bearing disk 44 to be formed of any convenient material. However, the bearing disk is typically formed of a conventional formable bearing compound, such as a Teflon loaded material known as Turcite, which compound is available from Shamban, Inc. of Santa Monica, Calif.

The base 46, as best shown in FIGS. 3A, 3B, 3C and 3D, is generally cylindrical having a saddle surface 68 on one end and a bore 70 extending axially inwardly from an opposite end. The outer surface 71 of the boss member 46 is configured to be a slip fit with the bore 36. A pair of arms 72 extend to define the saddle surface 68 with a radius of curvature generally equal to the radius of curvature of the tiding surfaces 64 of the bearing disk. The axis of the curvature of the saddle surface extends in a plane which is orthogonal to the axis of the bearing surfaces 56. As shown more particularly in FIG. 4, a cylindrical base 74 extends from a bottom surface 76 of the bore 70 to secure a spring 78, as discussed in greater detail below. As best seen in FIG. 5, the bearing disk 44 pivots on the saddle surface 68 of the base 46 to permit the bearing surfaces 56 of the bearing disk 44 to align perfectly with the axis of translation "A" of the rack 24 and form the hydrostatic bearing described above. As shown in FIG. 4, the bearing disk 44 and base 46 are positioned within the bore 36 of the sleeve 30 against the rack 24 and away from the annular shoulder 38 of the bore 36 by the spring 78.

During assembly, the rack bearing assembly 40 is inserted into the bore 36 through the port 32 before the rack 24 is installed in the housing 10. The rack 24 is then inserted through the cylinder 14 and the spring assembly 42 is assembled in the threaded aperture 34 of the sleeve 30. The spring assembly 42 includes the spring 78, adjuster plug 80, and lock nut 82. The adjuster plug 80 is tightened against the base 46 and then rotationally backed off a minimal predetermined distance, such as 10°, in order to permit some axial movement of the rack bearing assembly 40. The lock nut 82 is then tightened against the sleeve to maintain the position of the adjuster plug 80.

The minimal predetermined distance of 10° is significantly less than that normally encountered when assembling yoke assemblies of the prior art. This is enabled by the extra degree of freedom provided by the bifurcated rack bearing assembly 40 whereby the tightening of the adjuster plug 80 against the base 46 can be accomplished in a more precise manner thus resulting in improved rotational position calibration precision.

Figure 6:
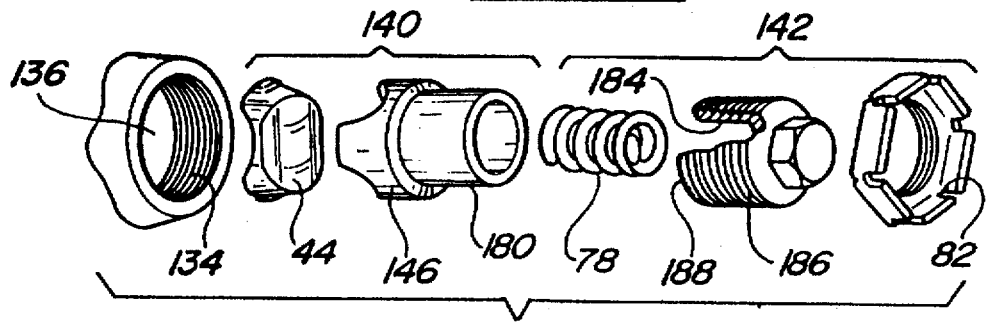
FIG. 6 is an exploded perspective view of a preferred alternative embodiment in accordance with the invention.

As shown in FIGS. 6, 7 and 8, a preferred alternative embodiment of the invention is thereshown suitable for use in steering systems such as manufactured by the Saginaw Division of General Motors of Saginaw, Mich. wherein a complete yoke assembly is assembled from one side within a juxtaposed bore 136 and threaded aperture 134. In this case, the bore 136 is formed with a smaller diameter than the minimum diameter of the threaded aperture 134. This permits insertion of a rack 24 before insertion of a bifurcated rack assembly 140 within the bore 136 and a spring assembly 142 into the threaded aperture 134.

The preferred alternative embodiment differs from the preferred embodiment disclosed above in that the alternative embodiment utilizes a modified base 146. The bearing disk 44 is the same, again comprising a pair of pads 54 extending radially outwardly from the outer surface 60 to slidingly locate the bearing disk 44 in a transverse manner with reference to the axis of translation "A" and the bore 136. The base 146, on the other hand, has a cylindrical sleeve 180 which extends axially outwardly from an annular shoulder surface 182 to be slidingly received within a bore 184 of the adjuster plug 186. In this way, the sleeve 180 of the base 146 slides within the bore 184 of the adjuster plug 186 with the spring 78 extending therebetween, as described above.

During assembly, the adjuster plug 186 is tightened until an outer end 188 contacts the annular shoulder surface 182 of the base 146 and is then backed off a very small predetermined distance such as 3° to permit travel of the base 146 within the adjuster plug 186 and accommodate any runout of the teeth 28 of the pinion gear 20. Because the sleeve 180 slides within the adjuster 186, the shoulder surface 182 is positioned perfectly coplanar with the outer end 188 of the adjuster plug. The perfect orthogonal alignment permits the small backed off distance compared to prior art devices which do not maintain the coplanar relationship of the shoulder surface 182 and outer end 188. This provides still more improved rotational position calibration precision by removing the last vestige of over-constraint in the design of the assembly.

It is desirable to utilize such a small back off distance because it minimizes operating clearance in the event that applied torque (i.e., to the steering wheel) is sufficient to overcome the bias of the spring 78 and drive the teeth 22 of the rack 24 away from the teeth 28 of the pinion gear 20. In such a case, the annular shoulder 182 is merely driven a very small distance into contact with the proximate outer end 188. It is quite permissible to run the mesh between the teeth 28 and the teeth 22 at the minimal operating clearance. Because of this, a lighter spring can be utilized than those of the prior art yoke assemblies wherein indeterminate operating clearances precluded possibly unacceptable operational tooth separation. Utilizing a lighter spring serves to reduce Coulomb friction both between the rack 24 and the bearing surfaces 56, and the teeth 28 and the teeth 22. In fact, the choice of spring force is entirely governed by the amount of initial torque desired by the system designer rather than any other mechanical consideration. The result is an optimum "on-center feel" with no "stickiness" perceived by a driver.

A yoke assembly utilizing either of the bifurcated rack bearing assemblies 40 and 140 is suitable for direct substitution with conventional yoke assemblies without other modification of the steering system. It is merely necessary to substitute mating rack bearing and spring assemblies of the invention for the rack bearing and spring assemblies ordinarily furnished, and substitute a weaker spring 78 as desired for a particular application.

Accordingly, disclosed above are improved yoke assemblies which may be substituted for a conventional yoke assembly in a conventional steering system to greatly improve the performance thereof. The bifurcated rack bearing assemblies utilized permit perfect alignment of their support surfaces coaxially with the axis of translation of the otherwise conventional steering system's rack. Because of the improved mechanics described above, it is also possible to use a lighter spring than in the prior art systems. Accordingly, the rack moves smoothly in either direction with minimal hysteresis due to Coulomb friction and without the catching which is frequently associated with movement in one direction of the prior art devices.

While the present invention has been described in connection with the preferred embodiments of the various figures, it is also understood that other similar embodiments may be used or modifications or additions may be made to the described embodiments for performing the same function of the present invention without deviating therefrom. Therefore, the present invention should not be limited to any single embodiment but, rather, construed in breadth and scope in accordance with the recitation of the appended claims:

I claim:

1. An apparatus for maintaining a rack and pinion in meshing engagement, said rack movable within a housing along an axis of translation within said apparatus comprising:

a bearing member having at least one elongated upper cylindrical surface spaced apart from a lower generally cylindrical surface, said upper cylindrical surface extending in the direction of said axis of translation of said rack to slidingly receive said rack, said lower cylindrical surface of said bearing member formed about a second axis on a plane extending through said rack in a nominally orthogonal direction with reference to said axis of translation of said rack for allowing said bearing member to pivot about said second axis;

a base member slidingly movably mounted within said housing, said base member having an outer end having a curved surface formed to receive a portion of said lower cylindrical surface of said bearing member, said curved surface aligned to permit said bearing member to pivot on said curved surface about said second axis and supporting said rack for movement along a plane extending through said axis of translation and said pinion; and means for biasing said upper cylindrical surface of said bearing member towards said rack.

2. The apparatus of claim 1 further comprising opposed pads formed on said bearing member in a direction nominally orthogonal to said axis of translation to slightingly locate said bearing member within said housing.

3. The apparatus of claim 1 further comprising an adjuster plug formed with a bore for slidingly receiving a portion of said base member.

4. The apparatus of claim 3 further comprising said base member having an annular shoulder surface and said adjuster plug having an outer end, said outer end being displaced from said annular shoulder approximately 3° of rotation in a threaded bore of said housing.

5. The apparatus of claim 3, further comprising said base member having an annular shoulder surface and said adjuster plug having an outer end which are maintained in a perfectly coplanar relationship during sliding movement of said base member within said adjuster plug.

6. The apparatus of claim 1, wherein said lower cylindrical surface has a radius of curvature at least as great as the radius of curvature of said rack.

* * * * *